Aug. 6, 1929.　　　A. J. KROPP　　　1,723,943
DEVICE FOR REMOVING ROOTS
Filed July 29, 1927　　2 Sheets-Sheet 1
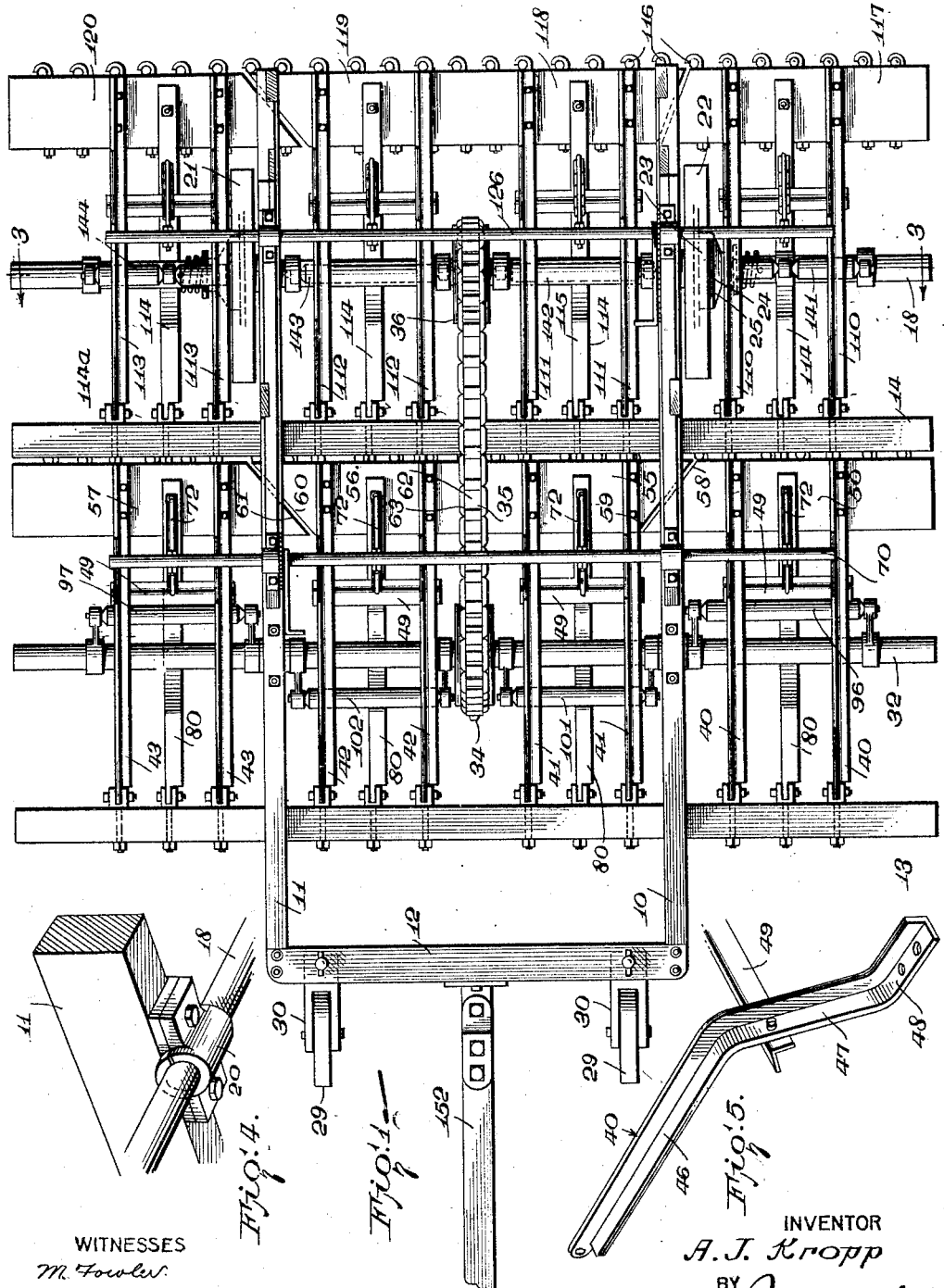
WITNESSES
INVENTOR
A. J. Kropp

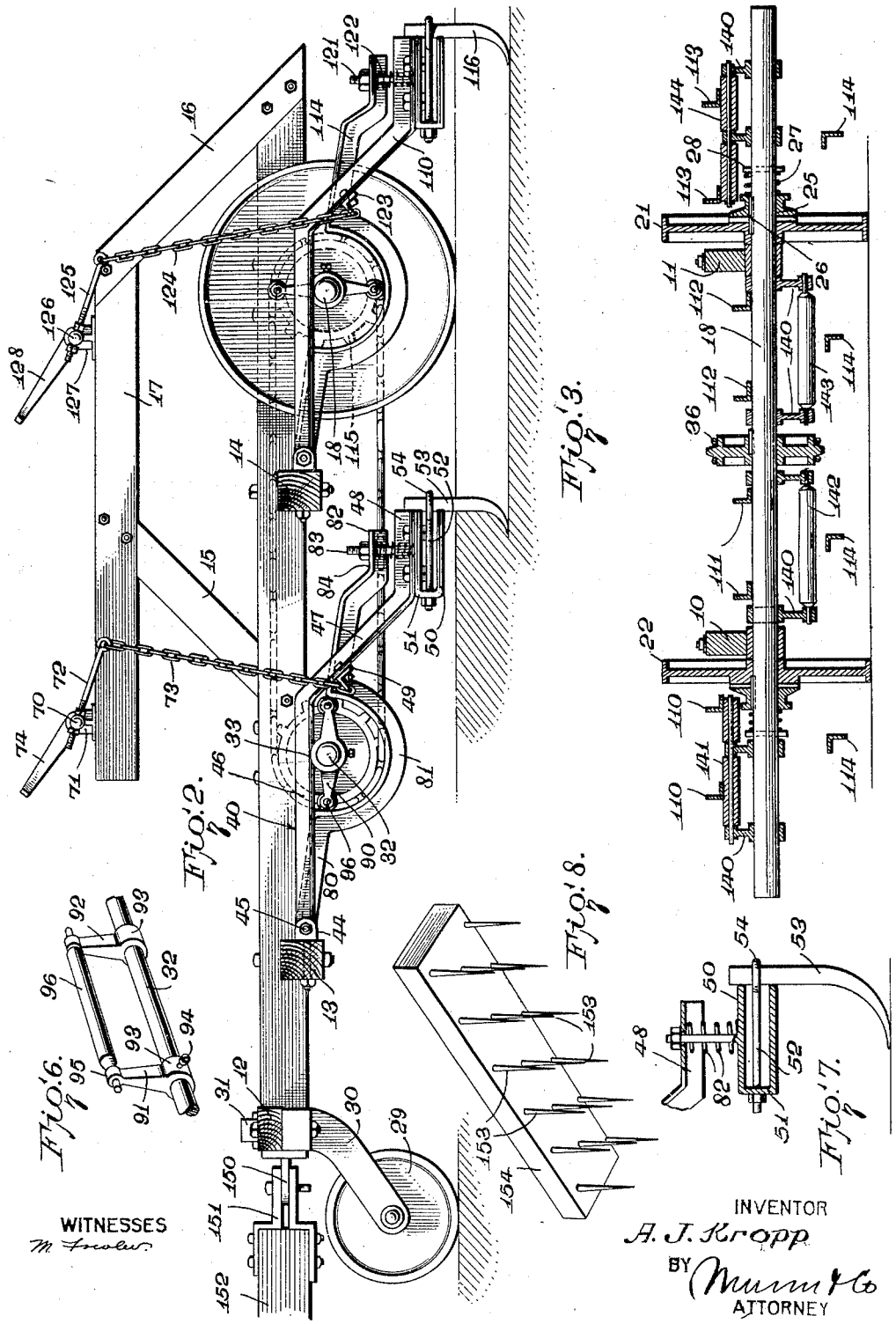

Patented Aug. 6, 1929.

1,723,943

UNITED STATES PATENT OFFICE.

ANDREW J. KROPP, OF DOROTHY, MINNESOTA.

DEVICE FOR REMOVING ROOTS.

Application filed July 29, 1927. Serial No. 209,381.

This invention relates to cultivating machines, and more particularly to a device for removing roots.

An object of the invention is the provision of a device having a plurality of movable frames equipped with teeth for engaging and removing roots from the soil and in which the frames are oscillated in a prearranged manner so that when the teeth of certain of the frames are in ground-engaging position the other frames will be elevated.

A further object of the invention is the provision of a device for removing roots of certain kinds of objectionable grass and thistle and releasing removed roots at intervals so that the sun and wind will cause drying of the roots, thereby stopping the growth, the device including movable frames equipped with teeth which are oscillated in series of alternate movements whereby the grass will be deposited at distances of eight feet.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 designates a plan view of the root remover constructed in accordance with the principles of my invention, Figure 2 is a side view of the root remover along the line 2—2 of Figure 1, Figure 3 is a transverse vertical section taken along the line 3—3 of Figure 1, Figure 4 is a view in perspective showing the bearings for an operating shaft, Figure 5 is a view in perspective of an oscillating bar which supports the frames carrying the root engaging teeth, Figure 6 is a view in perspective of the cam means for elevating the tooth equipped frames at intervals, Figure 7 is an enlarged vertical section showing the method of attaching the root removing teeth to the frames, and Figure 8 is a view in perspective of a modified form of the root-removing instrumentality.

Referring more particularly to the drawings, the supporting structure consists of a pair of spaced longitudinal bars 10 and 11 connected together at their forward ends by a transverse bar 12. A pair of transverse bars 13 and 14 are secured to the underface of the longitudinal bars 10 and 11 with the ends of these last-mentioned bars extending laterally beyond the longitudinal bars. A standard 15 is connected to each longitudinal bar adjacent the rear end and inclined rearwardly at an angle to the horizontal. A second standard 16 is connected to each of the longitudinal bars at their extreme rear end and inclined forwardly at an acute angle to the horizontal. The bar 17 is connected to the upper end of each pair of standards 15 and 16 and extend forwardly beyond the standards 15.

An axle 18 is mounted for rotation in bearings 19 carried by the underface of the rear portions of the longitudinal bars 10 and 11. Wheels 21 and 22 are mounted for rotation on an axle 18 and are provided with a plurality of dogs 23 adapted to engage dogs 24 of a sliding clutch member 25 which is slidably keyed as shown at 26 to the shaft 18. The dogs of the clutch members 25 are maintained in rigid engagement with the dogs of the wheels 21 and 22 by means of a spring 27 which is engaged at one end by a pin 28 passing through a perforation in the shaft 18. These clutch members cause rotation of the shaft 18 through the track wheels 21 and 22 but permits the wheels to be revolved in a reverse direction without actuating the shaft.

The supporting structure consists of the longitudinal bars 10 and 11 and the transverse bars 13 and 14 are maintained in spaced relation with the ground through wheels 29 carried in brackets 30 which are bolted, as shown at 31, to the transverse bar 12.

A shaft 32 is rotatably mounted in bearings 33 secured to the underface of the longitudinal bars 10 and 11 and is provided with a sprocket 34 intermediate its ends which is driven through a chain 35 trained over a sprocket 36 rigid with the axle 18. The ends of the shaft 32 extend laterally from the longitudinal bars or beams 10 and 11.

A plurality of pairs of spaced bars 40, 41, 42 and 43 are pivotally mounted on the transverse bar 13. This pivotal mounting consists of an eye bolt 44 which is secured to the bar or beam 13 by means of a nut with the eye disposed inwardly of the bar with a pin or bolt 45 passing through the eye of the bolt and through the various oscillating bars 40 to 43, inclusive. It will be noted that the eyes of the bolts are bifurcated in order to aid in maintaining the oscillating bar in a vertical plane during rocking movement. Each of the bars of the rocking or oscillating bars consists of a horizontal portion 46, an inclined portion 47 and a horizontal portion 48. As shown more particularly in Fig. 5 these rocking bars are made of angle iron. A short transverse bar 49 connects the angularly disposed portion 47 of pairs of the bars for aiding in maintaining the bars in spaced relation.

A U-shaped frame 50 is connected to each series of spaced rocking bars and disposed in horizontal position by reason of the connection with the member 48 of said rocking bars. The bridging portion 51 of the frames is perforated at intervals to receive eye bolts 52 which are locked in position by means of nuts in the usual manner and through the cooperation of teeth 53 which are received by the eyes 54 of the bolts and forced into rigid engagement with the outer free end of the legs of the U-shaped member 50. It will be noted that a series of the frames are provided. Frame 50 is connected to the rocking bars 40 while frames 55, 56 and 57 are respectively connected with a series of spaced rocking bars 41 to 43, inclusive. Frame 50 has the inner end sheared at an angle as shown at 58 which is supplementary to the shearing of one end 59 of the frame 55. The frame 56 is sheared at an angle as shown at 60 which is supplementary to the shearing 67 of the inner end of the frame 57. The frames 55 and 56 have their inner adjacent ends parallel as shown, respectively, at 62 and 63.

One end of a rock shaft 70 is pivotally mounted in bearings 71 secured to the bars 17 and are provided with arms generally designated by the numeral 72 projecting inwardly from the rock shaft 70. A chain 73 is secured to the free end of the arm 72 while the other end is secured to the transverse bar 49. An operating arm 74 is secured to the shaft 70 so that the shaft may be manually rocked for elevating the various frames 50 and 55 to 57, inclusive, when desired.

Each member of a plurality of rocking members 80 is alternately disposed relative to one of the oscillating bars 40 to 43, inclusive, and is provided with an arcuately-shaped portion 81 adapted to embrace the shaft 32. The members 80 are pivotally connected with the frame and are normally maintained in a horizontal position by means of a spring 82 embracing a bolt 83 secured to any one of the frames 50 or 55 to 57, inclusive. A horizontal portion 84 of each member 80 is provided with a perforation to receive the bolt 83 and the upper end of the spring 82 normally presses against the underface of the horizontal portion 84 of each rocking member 80, thereby tending to maintain each of the members in a horizontal position.

A cam member, generally designated by the numeral 90, consists of a pair of arms 91 and 92 which are maintained in spaced relation on the shaft 32 by means of collars 93 and set screws 94. The arms are provided with bearings 95 at their outer ends to receive a roller 96. It will be noted that the roller 96 or a roller 97 are adapted to engage the arcuately-shaped portions 81 of the respective members 80 for depressing the said members. It will be noted that the arms 91 and 92 which carry the rollers 96 and 97 are disposed in substantially the same plane and at one side of the axis of the shaft 32. At a diametrically opposite point are pairs of spaced arms 100 carrying rollers 101 and 102 which are adapted to engage, respectively, the pairs of oscillating bars 41 and 42 for elevating the bars and likewise elevating the frames carried by the ends of the bars. The rollers 101 and 102, respectively, engage the curved portions 81 of the rocking members 80 which are associated with the rollers 100 and 102 for depressing the members 80 and for forcing the frames 55 and 56 simultaneously downwardly for maintaining the teeth carried by the frames in ground-engaging position.

A similar form of operating mechanism as has just been described is associated with the axle 18 for alternately depressing and elevating the ground-engaging teeth. In this construction pairs of oscillating arms 110, 111 and 112 and 113 are pivoted at their inner ends to bifurcated eye bolts 114 which are carried by the frame 14. For each pair of oscillating bars just described a rocking member 114 is provided which has an arcuately-shaped portion 115 adapted to be engaged by rollers for depressing the bars 114 and for forcing the teeth 116 into the ground. The oscillating bars respectively carry at their outer ends frames 117, 118, 119 and 120. These frames are rigidly secured to pairs of oscillating bars and a bolt 121 made rigid with the rear frames project upwardly moves through perforations in the outer ends of the oscillating members 114. A spring 122 tends to maintain the bars 114 in a normal horizontal position. Each of the bars 114 and 113 are provided with transverse bars 123 to which is secured a chain 124. These chains extend upwardly and are secured to the outer free ends of arms 125 rigidly connected with a shaft 126 mounted in bars 127 carried by the spaced bars or beams 17. An arm 128 is rigid with the shaft 126 whereby the shaft may be manually rocked. The inner ends of the frames 117 and 120 and the outer ends of the frames 118 and 119 are sheared at an angle and in the same manner as has been described with reference to the forward frames which carry the ground-engaging teeth. Spaced arms 140 are secured to the axle 18 and carry rollers 141, 142, 143 and 144. The rollers 141 engage the oscillating bars 110 for elevating the same and likewise the frame 117 while said rollers engage the arcuately-shaped portions 115 of the oscillating members 114 for depressing said members and aiding in not only forcing the teeth 116 into the ground for a predetermined length of time or at such time as the roller is traveling over the arcuately-shaped member 115. It will be noted that the rollers 141 elevate the bars 110 at a diametrically opposite point from the lowering of the bar 114. The rollers 142 and 143 simultaneously elevate, respectively, the bars 111 and 112 at a diametrically opposite point from the lowering of the bar 114 which is disposed between pairs of the oscillating bars 111 and 112. The rollers 142 and 143 are disposed at diametrically opposite points from the rollers 141 and 144 so that the frames 118 and 119 are elevated when the frames 117 and 120 are lowered or are being lowered. It will be further noted that the arms 140 are located at substantially 90° from the arms 90 and 100. The front transverse bar 12 is provided with a coupling 150 which is adapted to be connected with a coupling 151 carried by the rear end or draw bar 152 of a tractor, not shown, so that the device may be drawn along the ground.

At times it may be necessary to employ straight teeth 153 as shown in Fig. 8. For this purpose the frames consist of bars 154 of sufficient width which are inserted within the U-shaped frames 50 and secured thereto in any approved manner or the plates or bars 154 may be secured directly to the horizontal portions 48 of the various oscillating bars.

I claim:

1. A device of the character described comprising a supporting structure, an axle rotatably mounted on the structure, traction wheels associated with the axle, a plurality of pairs of bars arranged in the same plane and pivotally connected to the supporting structure, a frame rigidly secured to the free end of each pair of bars, cam members carried by the axle and adapted to be moved into engagement with the pairs of bars for oscillating the bars and for elevating the frames, said frames being equipped with root-engaging teeth, the cams being so arranged on the axle that certain of the frames are elevated alternately with other frames, and means actuated by the cams for forcing the frames downwardly for causing the teeth to engage in the ground.

2. A device of the character described comprising a supporting structure, an axle rotatably mounted on the structure, traction wheels associated with the axle, a plurality of pairs of bars arranged in the same plane and pivotally connected to the supporting structure, a frame rigidly secured to the free end of each pair of bars, cam members carried by the axle and adapted to be moved into engagement with the pairs of bars for oscillating the bars and for elevating the frames, said frames being equipped with root-engaging teeth, the cams being so arranged on the axle that certain of the frames are elevated alternately with other frames, a shaft mounted for rotation on the structure, operative connections between the shaft and the axle whereby the shaft is revolved, a plurality of pairs of bars pivotally mounted on the structure adjacent the shaft, a frame rigid with the free end of each pair of bars and provided with root-engaging teeth, cams carried by the shaft and adapted to engage pairs of oscillating bars so that certain of the last-mentioned frames will be elevated alternately with other frames, and means actuated by the cams for forcing the frames downwardly for causing the teeth to engage in the ground.

3. A device of the character descsribed comprising a supporting structure, an axle rotatably mounted on the structure, traction wheels associated with the axle, a plurality of pairs of bars arranged in the same plane and pivotally connected to the supporting structure, a frame rigidly secured to the free end of each pair of bars, cam members carried by the axle and adapted to be moved into engagement with the pairs of bars for oscillating the bars and for elevating the frames, said frames being equipped with root-engaging teeth, the cams being so arranged on the axle that certain of the frames are elevated alternately with other frames, said cams including a pair of arms rigid with the axle, and rollers revolvably mounted in the free ends of the arms.

ANDREW J. KROPP.